Jan. 4, 1966  C. F. BINKERT ETAL  3,227,538
APPARATUS FOR BENDING GLASS SHEETS OR PLATES
Filed Dec. 10, 1954

INVENTORS
Carl F. Binkert and
BY Leslie H. Laine
Nobbe & Swope
ATTORNEYS

United States Patent Office 3,227,538
Patented Jan. 4, 1966

1

3,227,538
APPARATUS FOR BENDING GLASS
SHEETS OR PLATES
Carl F. Binkert, Toledo, and Leslie H. Laine, Perrysburg, Ohio, assignors to Libbey-Owens-Ford Glass Company, Toledo, Ohio, a corporation of Ohio
Filed Dec. 10, 1954, Ser. No. 474,545
4 Claims. (Cl. 65—289)

The present invention relates broadly to the bending of glass sheets or plates, and more particularly to an improved bending mold and apparatus associated therewith for positioning a glass sheet to be bent in bending relation to the shaping surface of the mold and for guiding the sheet as it is bent into conformity with said shaping surface.

The present-day production of bent glass sheets requires not only different and improved types of bending molds, but also new and improved types of co-acting mold equipment in order to produce on a commercial scale curved glass sheets of good optical properties and having close dimensional tolerances which eliminates the need for selective fitting and installation.

In the production of curved glass sheets, it is important that the flat sheet to be bent is accurately positioned over the mold shaping surface and guided into conformity therewith during the bending action. This is particularly the case when the glass sheets are pattern cut before being bent, and when the mold is of the hinged type to produce relatively sharp curvatures. In such molds, the flat glass sheet is customarily positioned in bending relation therewith while the mold is in the open position. As the mold is passed through a bending furnace, the sheet softens and sags downwardly. At the same time, the mold moves from the open position to the closed position in which the glass sheet is received on the mold shaping surface. The sheet locating and guiding means associated with the mold must, therefore, be capable of accurately depositing the glass sheet on the mold shaping surface, and also to deposit the sheet in such a manner as to prevent sliding contact with the shaping surface which might cause the sheet to be marred and produce optical defects.

Therefore, an important object of the invention is to provide improved apparatus for bending glass sheets or plates.

Another object of the invention is to provide an improved bending mold and apparatus associated therewith for positioning and guiding a glass sheet to be bent both before and during the bending operation.

Another object of the invention is to provide an improved locator block for use with a bending mold and which is used to position a glass sheet upon the mold preliminary to the bending operation.

A further object of the invention is to provide a locator block having high resistance to wear and to fusion of the glass thereto during bending.

Other objects and advantages of the invention will become more apparent during the course of the following description when taken in connection with the accompanying drawings.

In the drawings wherein like numerals are employed to designate like parts throughout the same:

2

Figure 4:
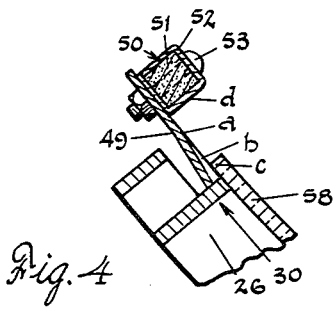

FIG. 4 is a magnified view of one end of the mold showing the construction of the improved locator block associated therewith.

Figure 1:
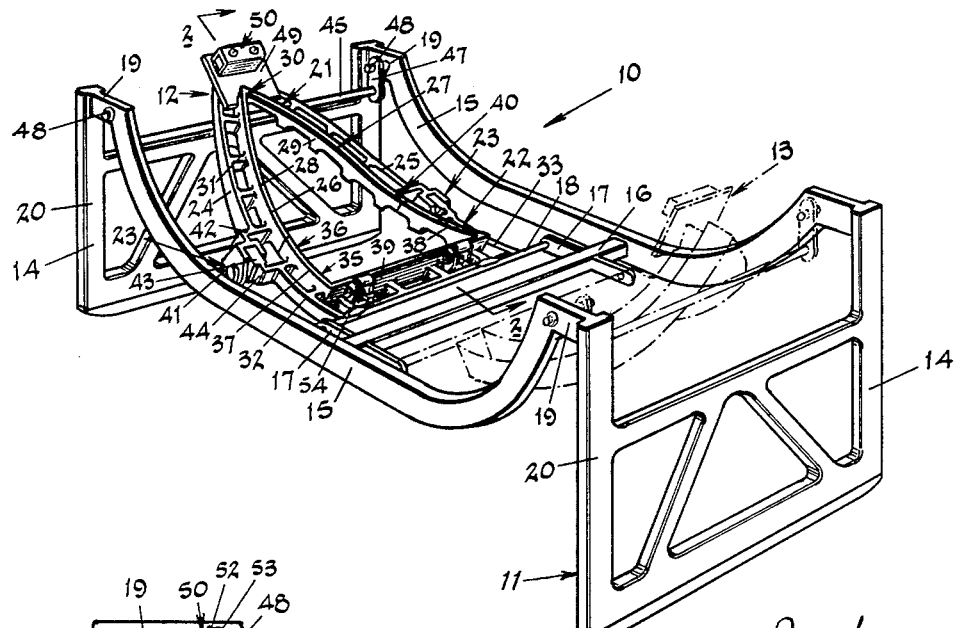
FIG. 1 is a perspective view of a rack having mounted thereon a pair of bending molds produced in accordance with the invention.

With reference now to the drawings, and particularly to FIG. 1, the bending apparatus herein provided is generally designated by the numeral 10 and comprises a supporting rack 11 upon which are carried a pair of glass bending molds 12 and 13.

The rack 11 comprises an open, substantially rectangular tubular framework having opposite end sections 14, and longitudinally disposed side rails 15 connected to said end sections to provide a rigid structure. Arranged transversely between and secured to the side rails 15 intermediate the opposite ends thereof is a tubular bar 16 provided adjacent its ends with oppositely directed, longitudinally extending arms 17 in the outer ends of which are rotatably carried rods 18 that parallel bar 16.

In the present embodiment of the invention, the rack 11 is formed to carry the two molds 12 and 13 whereby two sheets of glass may be simultaneously bent upon said molds. Although not essential, it is usually preferred that the molds be of the same shape and size so that similar and substantial duplication of curvature of the two sheets may be obtained. This is particularly advantageous in the producing of matched pairs of bent sheets having the same pattern cut outline and curvature which will permit their subsequent use as end lights of a sectional assembly of two or more parts.

To this end, the molds 12 and 13 are arranged on the rack so that like parts of each mold will be centrally disposed, while the body of each mold is oriented at an angle to the horizontal to elevate one end of the mold body above the other so that during the bending operation the glass sheets will, upon softening, settle down upon and conform to the curvature of the molds in the proper manner. By way of illustration, the adjacent inner ends of the molds 12 and 13 are arranged on the rack 11 so as to be materially lower than the outer ends thereof. To facilitate processing of the glass subsequent to bending, such as the tempering of the sheets by blasts of air, the side rails 15 of the rack 11 are concavely curved in their central portion to generally correspond to the angular position of the molds and have their ends formed as horizontal sections 19 which terminate at uprights 20 forming portions of the end frame 14.

Since the molds 12 and 13 are adapted to simultaneously produce similar curvatures in the respective glass sheets, they are of substantially the same construction and therefore a description of only one will be given.

Figure 2:
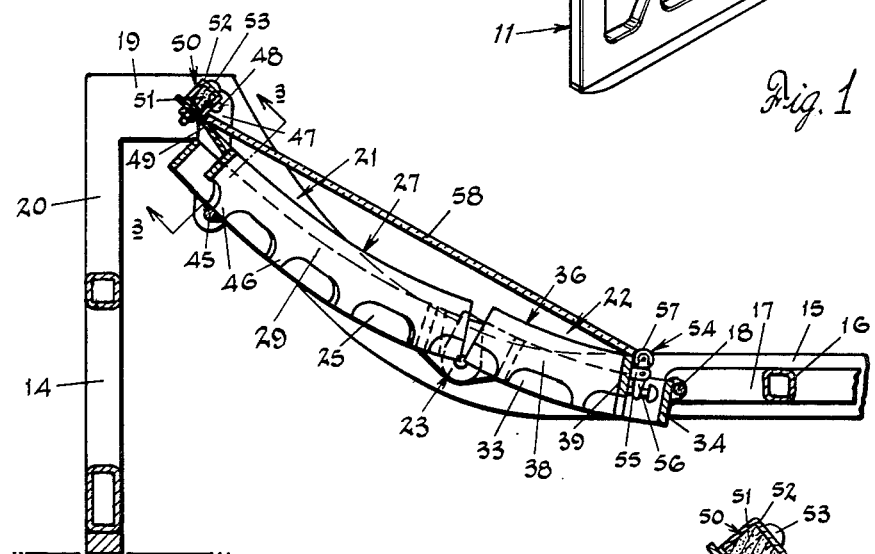
FIG. 2 is a partial longitudinal section taken along line 2—2 of FIG. 1 showing the mold in the open position with a glass sheet to be bent mounted thereon.
Figure 3:
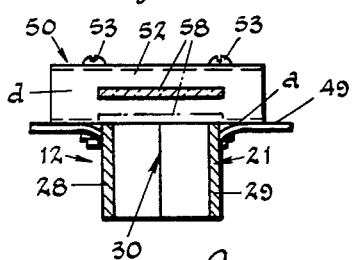
FIG. 3 is a transverse section taken along line 3—3 of FIG. 2.

As seen in FIGS. 1 and 2, the mold 12 is of the so-called hinge type and comprises two joined sections, an upper or end section 21, and a lower or base section 22, connected together at their inner adjacent ends by hinges generally designated 23. The upper mold section 21 is formed by opposite inwardly curved side bars 24 and 25 which are angularly connected to one another at their outermost ends. Arranged within the confines of the side bars is a triangular rail 26 having a shaping surface 27 formed on the upper edge thereof. The rail 26 is formed by spaced inwardly curved rails 28 and 29 connected together at their outermost ends to form the apex 30 of a triangle and which are secured to the side bars 24 and 25 by rigid web members 31. The base mold section 22 is formed by side bars 32 and 33 connected together at their outermost ends by a cross bar 34. Arranged within the confines of the end and side bars of the base section is a three-piece rail designated in its entirety by the numeral 35 and having a shaping surface 36 formed on its upper edge. The rail 35 comprises side rail portions 37 and 38 rigidly secured to the side bars 32 and 33 by additional web members 31 and having their ends opposite the hinges 23 connected together by a transverse end rail portion 39. The side portions 37 and 38 of the rail 35, carried by the base section of the mold, are substantially a continuation of the rail 26 carried by the upper section, so that the two rails 26 and 35 cooperate to form a continuous closed shaping surface designated in its entirety by the numeral 40 and which conforms to the peripheral outline of the flat glass sheets to be bent.

As previously mentioned, the upper section and the base section 22 are joined by hinges 23. Each of the hinges is formed by a yoke section 41 rigidly secured to outwardly extending web members 42 at which the inner ends of each of the side bars 24 and 25 terminate. Received within each of the yokes 41 are bar portions 43 rigidly secured to similar outwardly extending web members 44 at which the inner ends of each of the base section side bars 32 and 33 terminate. The upper mold section 21 is swingably supported by means of a transverse rod 45 rigidly secured to the lower edges of the side bars 32 and 33 and to the endmost of downwardly extending portions 46 of the rail 26 which, along with the rail 35, is upwardly notched at spaced intervals to cut down the gross volume of the mold and thereby lessen the heat demands on the bending furnace.

The opposite ends of the rod 45 project beyond the end section side bars and are rotatably carried in the lower ends of a pair of links 47, each of which is swingably supported at its upper end about a pin 48 fixed in the horizontal portion 19 of the rack side bars. The base section 22 is similarly supported by the transverse rod 18 fixedly attached to the cross bar 34 and which has its opposite ends extending outwardly beyond the base section side bars and rotatably supported in the longitudinally extending arms 17.

At the upward termination point, or triangular apex 30 of the shaping surface 27, there is provided a rectangular guide plate 49 which has its inner edge notched to receive said apex, and which is rigidly joined to the outer surfaces of the rails 28 and 29. Along the upper end of the plate and on the upper surface *a* thereof, there is provided a substantially rectangular locator block 50 which comprises an inner core 51 of suitable heat resistant material, such as Marinite, and an outer metallic casing 52, having a lower specific heat than the core 51, entirely surrounding the core 51 and spacing it from the upper surface of the guide plate. The block 50 is secured to the plate by means of bolts 53 having their heads seated against the top of the casing 52 and their ends protruding through the plate 49 and secured thereto by nuts.

As seen in FIG. 4, the upper surface *a* of the plate 49 is in substantially the same plane of curvature as the shaping surface 27 of the upper mold section and provides a continuation thereof. In the central portion of the guide plate and extending outwardly from the apex 30 of the rail 26, there is provided a shallow groove *b* in the upper surface *a*, the purpose of which will be later described. The plate 49 is of sufficient thickness and is polished on its upper surface *a* so that there is little danger of fusion between a glass sheet to be bent and said surface.

On the base section of the mold and on the transverse rail portion 39 thereof, there is provided a pair of locators 54 positioned outwardly of said rail portion and which preferably are spaced in such a manner as to balance the weight of a glass sheet to be bent which rests thereon. Each of the locators 54 is similar to that disclosed in Patent 2,608,799, issued to E. W. Babcock, and comprises a bracket 55 on which is pivotally carried a frame 56 which loosely and rotatably supports a suitable locating element such as a ceramic sleeve 57. A range of pivotal movement is afforded the frame 56 whereby the locating element 57 may be suitably adjusted inwardly or outwardly from the adjacent shaping surface.

In operation, a flat sheet of glass 58 to be bent is placed with its lower end resting on the lower shaping rail portion 39 and against the sleeves 57. The central portion of the mold is then lifted upwardly into its open position as shown in FIG. 2, and the upper end *c* of the glass sheet is wedged between the top surface *a* of the guide plate 49 and the adjacent metallic surface *d* of the locator block casing 52. When so placed, the glass sheet 58 acts as a strut having its one end bearing against the surface *a* of the metallic plate 49 and adjacent locator block 50, and the other end against the shaping rail portion 39 and locator sleeve 57. This strut-like action maintains the mold in its open position prior to bending, and to compensate for the increased length of the mold while in the open position, the links 47 swing outwardly.

With the mold in the open position and the glass sheet supported thereon, the rack is passed through a bending furnace wherein the glass sheet 58 settles downwardly toward the mold shaping surface 40 under the influence of heat and gravity.

As the glass sheet begins to bend, the base section of the mold, which is restrained from horizontal or vertical movement by the rotatable rod 18, pivots about said rod and the ends of said section adjacent the hinges 23 describe a downward arc of fixed radius. At the same time, the adjacent ends of the upper section 21, due to their hinged relationship with the lower section, describe substantially the same arc. Simultaneously therewith, the upper end of the mold section 21 moves upwardly and inwardly, the links 47 accommodating this movement due to their rotatable connection with their fixed supporting pins 48. In the initial movement of the mold from the open position of FIG. 2, to the closed position of FIG. 1, the locator block 50 exerts pressure upon the edge of the glass sheet 58 wedged thereagainst. However, as the degree of movement increases, contact between the end *c* of the glass sheet and the locator block is broken and the end edge of the glass sheet slides downwardly over the surface *a* of the guide plate 49.

It is important, therefore, that the metallic casing 52 of the locator block is not at such a temperature as to cause the glass sheet to fuse thereto. Therefore, the inner heat resistant core 51 is provided and since it contacts the metallic casing 52 and thus slows down the heat absorption rate thereof, a relatively greater time interval under heat must elapse before the casing 52 would reach a given temperature as compared to the time interval required to reach the same temperature if the core were not used. Due to the time of movement of the bending apparatus through a bending furnace, the glass sheet 58 will reach bending temperature much sooner than the metallic casing 52 having the insulating core 51 therewithin. Thus, since the locator block is relatively cooler, any tendency for the glass sheet to fuse to the metallic casing is hindered or completely eliminated. If only the heat resistant core 51 were used, the strut-like action of the glass sheet before it begins to bend would cause the contacting surface of the core to spall or chip away. Therefore, by providing the metallic casing 52 therearound, the insulating effect of the core 51 is combined with the much greater resistance to wearing afforded by the metallic casing so that the core 51 and casing 52 complement one another and the better features of both are obtained by the improved construction herein provided.

As previously mentioned, the guide plate 49 has its upper surface contoured to conform to the shaping surface 27 and its central portion grooved immediately adjacent the triangular apex 30. Since the plate is so contoured and grooved, full contact between the sharp edge of the glass sheet and the guide plate is maintained throughout the major portion of downward travel of the sheet end *c* as the sheet bends to final form. Also, because of the upward movement of the tip of the mold end section 21 during the mold closing action, the guide plate 49 presents a continuously rotating surface, or plane of curvature, over which the end of the glass sheet moves during its downward travel. At substantially the same time as the end *c* of the glass sheet reaches the groove $b$ on the guide plate surface $a$, the mold is substantially closed and the slight further movement to effect complete closing causes the apex portion of the rail 26 to engage the under surface of the sheet end $c$ and space said under surface from the guide plate. Thus, the rotating, contoured surface of the guide plate moves in a predetermined path which is calculated to deposit the downwardly deflecting glass sheet substantially simultaneously over all portions of the mold shaping surface and thus prevents sliding contact which could cause optical defects in the now bent sheet.

It is to be understood that the form of the invention disclosed herein is to be taken as the preferred embodiment thereof, and that various changes in the shape, size and arrangement of parts may be resorted to without departing from the spirit of the invention or the scope of the following claims.

We claim:
1. In a bending mold for bending glass sheets, a first mold section comprising an end of the mold, a second mold section aligned in end-to-end relation with said first mold section, means for mounting said first mold section above said second mold section and for swinging rotative movement from a first position away from said second mold section to a second position in which the first mold section forms substantially a continuation of the second mold section and together said mold sections define a curvature to which a glass sheet is to be bent, a guide plate connected to said first mold section for supporting an end of a glass sheet for sliding movement thereover during the bending thereof and while said first mold section is moving from the first to the second position, means for supporting the second mold section for pivotal movement through an arc of fixed radius about a fixed axis, and means for connecting said mold sections to one another whereby the movement of said mold sections is synchronized.

2. In a bending mold as defined in claim 1, wherein the mold sections are connected to one another at a point adjacent their innermost ends.

3. In a bending mold as defined in claim 1, wherein the axis of pivotal movement of the second mold section is located adjacent the end thereof away from the first mold section.

4. In a bending mold as defined in claim 1, wherein a rotatable shaft is located at the axis of rotation of the first mold section and is operatively connected to said mold section, and means for supporting said shaft for lateral movement toward the second mold section.

References Cited by the Examiner
UNITED STATES PATENTS

| | | | |
|---|---|---|---|
| 2,452,488 | 10/1948 | Paddock et al. | 65—103 |
| 2,483,785 | 10/1949 | Schottland | 65—105 |
| 2,551,606 | 5/1951 | Jendrisak | 65—107 |
| 2,608,030 | 8/1952 | Jendrisak | 65—287 |
| 2,608,799 | 9/1952 | Babcock | 65—290 |
| 2,674,775 | 4/1954 | Willson. | |
| 2,683,334 | 7/1954 | Rugg et al. | 65—107 |
| 2,688,210 | 9/1954 | Jendrisak | 65—287 |
| 2,691,854 | 10/1954 | Rugg | 65—26 |
| 2,729,032 | 1/1956 | White | 65—289 |

FOREIGN PATENTS 674,495   6/1952   Great Britain.

DONALL H. SYLVESTER, *Primary Examiner.*

CHARLES R. HODGES, BENJAMIN BENDETT, ARTHUR P. KENT, *Examiners.*